US005634252A

United States Patent [19]

Jungles et al.

[11] Patent Number: 5,634,252

[45] Date of Patent: Jun. 3, 1997

[54] APPARATUS FOR ATTACHING PROTECTIVE TUBING TO A COMPONENT

[75] Inventors: Dennis E. Jungles, Freeport; Keith E. Noble, Baileyville; Ronald C. Roepke, Freeport; Robert A. Rogers, Lena, all of Ill.

[73] Assignee: Honeywell Inc., Minneapolis, Minn.

[21] Appl. No.: 622,127

[22] Filed: Mar. 26, 1996

[51] Int. Cl.⁶ .................................... B23P 19/04
[52] U.S. Cl. .................. 29/33 E; 29/241; 29/564.6; 254/134.3 R
[58] Field of Search .................. 29/33 E, 33 K, 29/564.1, 564.2, 33 M, 564.6, 564.7, 241; 254/134.3 R, 134.4

[56] References Cited

U.S. PATENT DOCUMENTS

| 4,574,440 | 3/1986 | Wirth et al. | 29/33 E |
| 4,655,129 | 4/1987 | Wirth et al. | 29/33 E X |
| 5,153,839 | 10/1992 | Cross | 29/564.1 X |
| 5,228,179 | 7/1993 | Fukuda et al. | 29/241 |
| 5,390,402 | 2/1995 | White et al. | 29/241 |

FOREIGN PATENT DOCUMENTS

| 4230441 | 3/1994 | Germany | 29/33 E |
| 1636877 | 3/1991 | U.S.S.R. | 254/134.3 R |

*Primary Examiner*—William R. Briggs
*Attorney, Agent, or Firm*—William D. Lanyi

[57] ABSTRACT

A tubing attachment apparatus is provided which automatically severs a preselected tubing segment from a continuously fed length of tubing, moves the tubing segment toward an operative position, slits the tubing to form an axial slit along its length, spreads the opposing edges of the axial slit and pushes the tubing segment to cause it to move over a wire portion of a component. The tubing segments are moved, along a first path defined by a guide rod, through the action of a carriage that is reciprocally movable relative to a support structure. A gripper and a pusher attached to the carriage move sequentially seared tubing segments along the first path and through the slitter and spreader to dispose the tubing segments over wires of components.

20 Claims, 10 Drawing Sheets

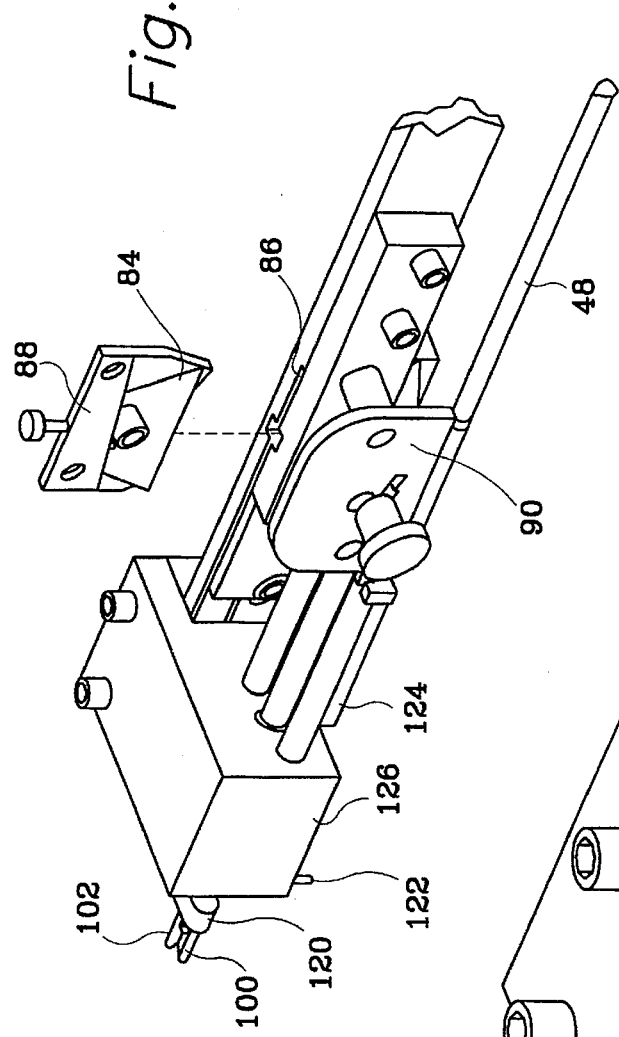
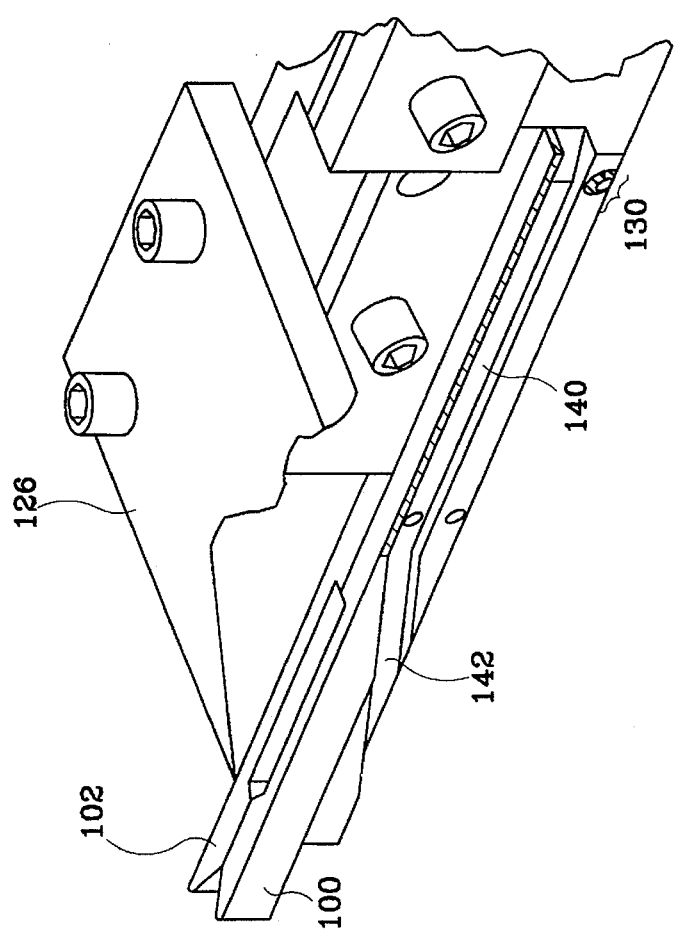

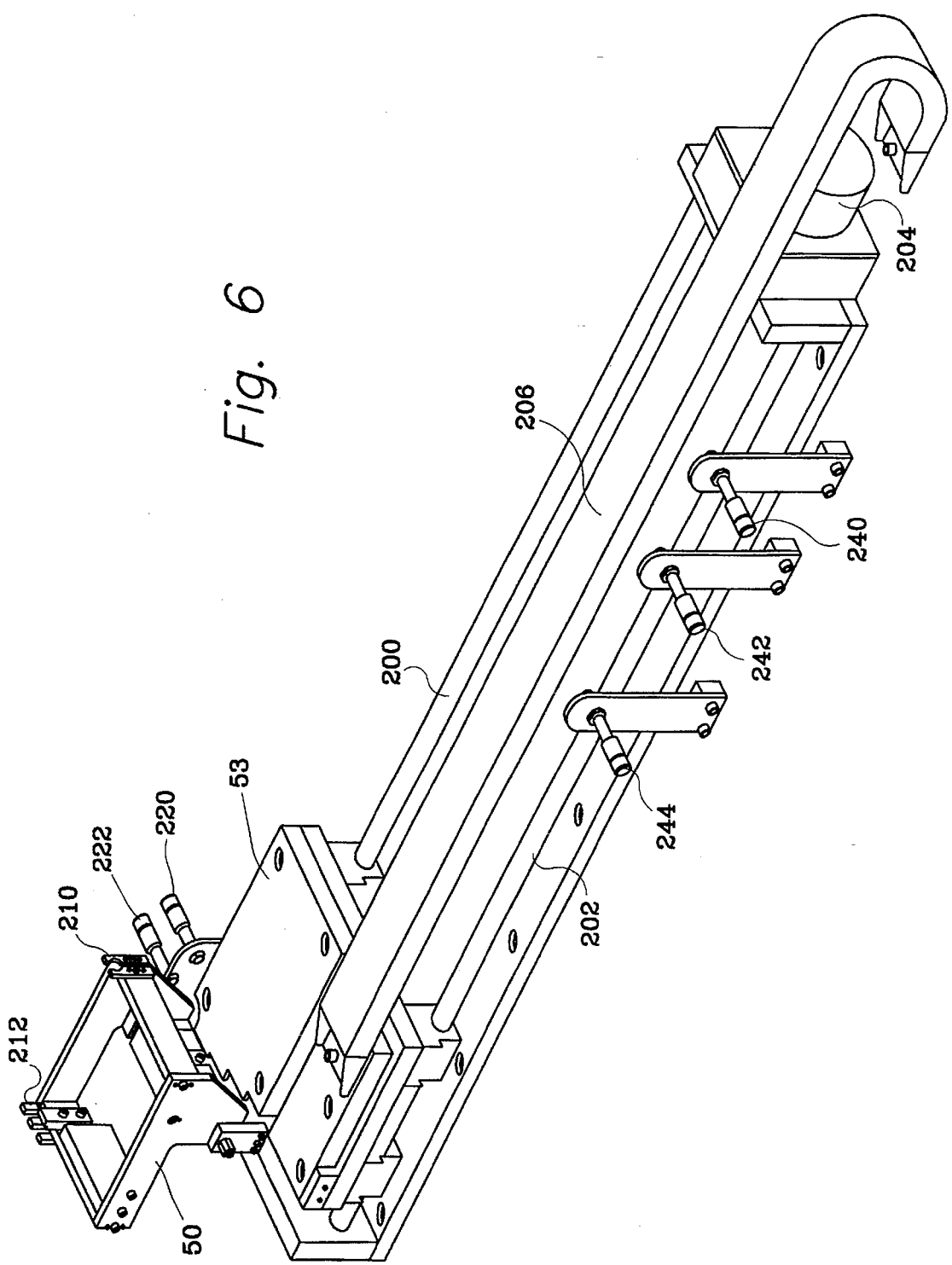

APPARATUS FOR ATTACHING PROTECTIVE TUBING TO A COMPONENT

BACKGROUND OF THE INVENTION

1. Field of the Invention

The present invention is generally related to automatic assembly machines and, more particularly, to an automatic assembly machine that attaches a protective tubing around the electrical wires of a component, such as a gear tooth sensor.

2. Description of the Prior Art

In many applications, electrical components comprise a functional end and a connector end that are connected to each other by one or more electrical wires. Many types of sensors used in automotive applications are constructed in this way. For example, a typical sensor may have a functional end in which certain sensitive components, such as Hall effect devices, magnetoresistive devices or temperature sensitive devices are contained. At another end of the sensor, an electrical connector or wire harness may be shaped to facilitate connection with another portion of the automobile's control system at a location remote from the location of the functional head of the sensor. The connector end and the functional sensing head are typically connected to each other by one or more electrically conductive wires. In order to protect the wires during both assembly into the automobile and subsequent use of the automobile, the wires between the connector end and the functional head of the sensor are protected by disposing a plastic tubing over them. The use of this convoluted tubing is well known and the protective tubing is commonly seen in many automobile applications in the engine compartment.

Since the protective tubing is inserted on the wires after the sensor is completely manufactured, the tubing is typically slit along its axial length and then assembled, by hand, over the wires between the connector end and the functional head of the sensor. The most common way to assemble the tubing onto the wire of the sensor is to manually spread the axial slit to provide a gap between opposing edges of the axial slit and then place the tubing over the wires with the wires passing between the opposing edges of the axial slit. After the tube is completely placed over the wires, the natural elasticity of the tube will cause the opposing edges of the axial slit to move back toward each other and close the tubing around the wires.

This type of assembly of the protective tubing over the wires is costly and time consuming. In addition, it requires repetitive hand movements by an operator that can be deleterious to the operator's health. It would therefore be significantly beneficial if the protective tubing could be assembled over the wires of a sensor without the need for manual intervention in the operations relating to feeding the tube into position, slitting the tube along its axial length, separating the opposing edges of the axial slit and placing the tube over the wires of the sensor.

SUMMARY OF THE INVENTION

The present invention provides a tubing attachment apparatus that comprises a support structure that can typically be made of metal brackets and platforms to provide support for the various components of the attachment apparatus. A means for guiding a length of tubing along a first path is attached to the support structure. The guiding means can comprise a rigid guide rod associated with a guide tube that feeds the tubing onto the guide rod. For purposes of efficiency, the tubing is generally provided in very long lengths on reels which may contain tubing that is of three thousand feet long or more.

The present invention also comprises a means for severing a plurality of tubing segments from the length of tubing on the reel. The severing means, which is attached to the support structure, measures a predetermined length of the tubing and cuts a tubing segment from the continually fed supply of tubing.

A carriage is slideably attached to the support structure for reciprocal movement along a second path which is generally parallel to the first path along which the tubing is guided by the guiding means. A tube slitter is attached to the support structure for slitting each of the plurality of tubing segments along its central axis to form an axial slit in the tubing segment. A spreader is attached to the support structure of the present invention for spreading opposing edges of the axial slit away from each other so that the conductive wires of a sensor can be disposed within the internal cavity of the tubing segment. The apparatus of the present invention also comprises a means for retaining the component proximate the spreader in order to facilitate the assembly of the tubing segment onto the wires of the component.

The present invention also comprises a means for gripping a first preselected one of the plurality of tubing segments and moving it away from the severing means and toward the tube slitter. In addition, the present invention comprises a means for pushing a second preselected one of the plurality of tubing segments past the tube slitter in order to form the axial slit. The pushing means also pushes the tubing segment over the spreader in order to spread the axial slit's opposing edges apart and onto a portion of the component where the conductive wires are located.

In certain embodiments of the present invention, additional components are provided to facilitate its operation. For example, a means for feeding the length of tubing from the feed reels to the guiding means is provided. This can comprise wheels that grip the tubing and move it toward the guiding means. In certain embodiments of the present invention, the feeding means can also be associated with the severing means which measures the length of each of the plurality of tubing segments.

In a particularly preferred embodiment of the present invention, the spreader comprises two fingers that have distal ends which are movable toward each other and away from each other. The distal ends of the fingers are movable toward each other in response to a compressive force that is exerted on the fingers by the opposing edges of the axial slit. In addition, the distal ends of the two fingers can comprise the retaining means that holds the component in place during the placement of the tubing segment onto the wires of the component. The severing means can also comprise a means for measuring a precise length of each of the plurality of tubing segments.

In one embodiment of the present invention, the gripping means and the pushing means are activated simultaneously prior to each movement of the carriage away from the severing means and toward the tube slitter. In this embodiment of the present invention, the gripping means and the pushing means are attached to the carriage.

Although the component onto which the tubing segments are attached can be a gear tooth sensor, it should be understood that many types of sensors can also be attached to tubing segments through the use of the present invention.

In a preferred embodiment of the present invention, the guiding means also comprises a guide tube which is aligned in spaced relation with a guide rod. The tubing is fed from a supply reel through the guide tube. At one end of the guide tube, a tip of the guide rod is aligned in coaxial relation with the central opening of the guide tube so that the tubing passes onto the guide rod as it exits from the guide tube. The tube slitter can comprise a knife edge that is associated with the guide rod in such a way that a portion of the knife edge is disposed in an axial slot formed in the outer cylindrical surface of the guide rod.

BRIEF DESCRIPTION OF THE DRAWINGS

The present invention will be more fully and completely understood from a reading of the Description of the Preferred Embodiment in conjunction with the drawings, in which:

FIGS. 4 and 5 are perspective view of portions of the device shown in FIG. 3;

FIG. 6 is a portion of the present invention shown in FIG. 2; and

DESCRIPTION OF THE PREFERRED EMBODIMENT

Figure 1:
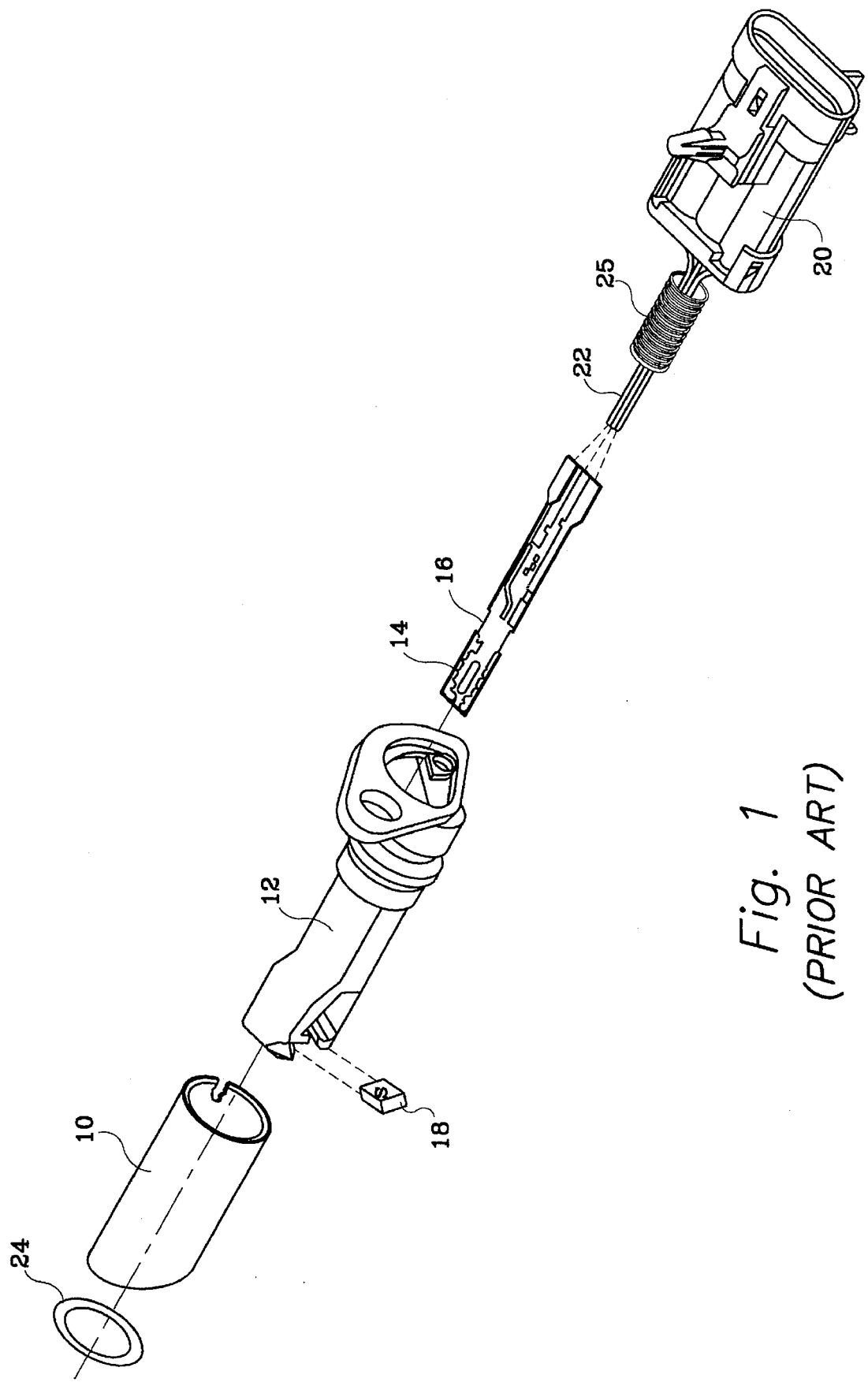
FIG. 1 shows a typical component on which tubing can be assembled through the use of the present invention.

Throughout the Description of the Preferred Embodiment, like components will be identified by like reference numerals.

Throughout the Description of the Preferred Embodiment of the present invention, the apparatus will be described in terms of a particular application for the insertion of convoluted tubing over the wires of a gear tooth sensor. However, it should be understood that the gear tooth sensor is used for the purposes of illustrating one particularly preferred embodiment of the present invention and is not limiting to all other embodiments of the present invention for use in inserting protective tubing over the wires of other components.

FIG. 1 is an exploded view of a gear tooth sensor which can be used in conjunction with the present invention. The gear tooth sensor shown in FIG. 1 is generally known to those skilled in the art and is available in commercial quantities from the MICRO SWITCH Division of Honeywell Incorporated. The gear tooth sensor shown in FIG. 1 comprises a plastic cover 10 into which a plastic housing, or carrier 12, is inserted. A printed circuit 14, which can either be rigid or flexible, is disposed within the housing 12. Although not shown in FIG. 1, a magnetically sensitive component can be attached to the printed circuit 14 in the region identified by reference numeral 16. A magnet 18 is also attached to the housing 12. A wire harness 20 is connected by wires 22, to the printed circuit 14. A seal ring 24 is disposed over the plastic cover 10 to provide an oil seal when the gear tooth sensor is disposed within an engine of an automobile. After the components shown in FIG. 1 are assembled together, the gear tooth sensor will have three major segments. The wire harness 20 will be at one end of the assembly and the plastic cover 10 will be at the other end of the assembly with its internal housing 12, magnet 18 and printed circuit 14 disposed therein. Between these two major segments of the gear tooth sensor, a predetermined length of wire 22 will extend between the harness 20 and cover 10. Throughout the Description of the Preferred Embodiment of the present invention, the structure represented in FIG. 1 will be described in terms of a sensing head, a wire harness and connective wires. The sensing head will comprise the plastic cover 10 and its internal components, the wire harness 20 will comprise the connector shown in FIG. 1 and the intermediate portion of the gear tooth sensor will comprise the wires 22.

In a typical application of a gear tooth sensor, a length of protective tubing 25 is disposed over the wires 22 to prevent them from being damaged during assembly into the automobile or during the subsequent use of the automobile.

The insertion of the protective tubing 25 over the wires 22 is the primary function performed by the apparatus of the present invention. When this assembly is performed manually, an operator must take a segment of tubing 25 which has been slit along its axial length, manually spread the opposing edges of the axial slit and place it over the wires 22. After the wires 22 are disposed within the internal opening of the protective tubing, the axial slit is closed by the natural elasticity of the protective tubing and the wires 22 are surrounded by the tubing.

Figure 2:
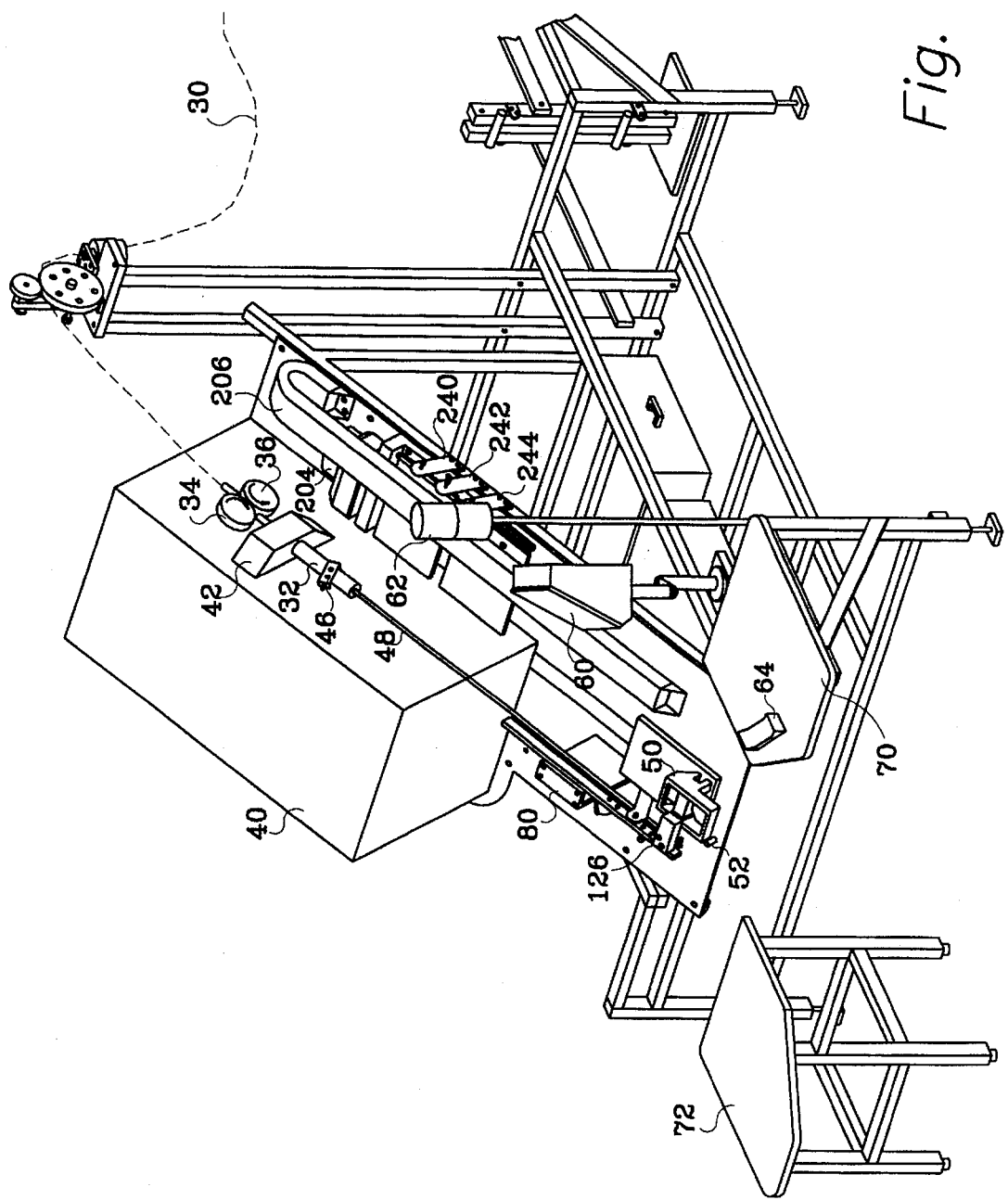
FIG. 2 is a perspective view of the present invention.

FIG. 2 is an overall perspective view of the present invention that shows the relative positions of several of its constituent components. Each of those components will be described below in greater detail. However, FIG. 2 represents the appearance of the present invention when used to assemble preselected lengths of protective tubing over the wires of a component, such as a gear tooth sensor.

In FIG. 2, a dashed line 30 represents the path along which a continuous length of tubing is provided from a feed reel (not shown in FIG. 2) to a means for guiding the tubing along a first path. A guide tube 32 has a central opening through which the length of tubing is passed. In the embodiment of the present invention shown in FIG. 2, two wheels, 34 and 36, combine to drive the tubing through the opening of the guide tube 32. In addition, a means for severing the tubing is provided within the box identified by reference numeral 40. In coordination with the rolls, 34 and 36, a cutting edge of a rotating severing blade is contained within the box identified by reference numeral 42. The severing means comprises a rotating blade that cuts tubing segments from the continuous length of tubing that is fed from the feed reel. Although not shown in detail in FIG. 2, the severing means is commercially available from the Versa Machinery Company and is identified as the Minicutter II. The severing means uses the rotation of the wheels, 34 and 36 to perform two functions. First, they drive the tubing down through the opening of the guide tube 32. Secondly, the severing means cuts the preselected tubing segment when a predetermined length of tubing passes between wheels 34 and 36. The presence or absence of tubing within the guide tube 32 is determined by a photoelectric sensor 46 that passes a light beam through the guide tube 32. After the tubing segment has been severed from the continuous length of tubing fed along dashed line 30, it passes on to guide rod 48. The guide rod 48 has a distal end which is aligned with the opening of the guide tube 32 in such a way that the tubing moves from the guide tube 32 directly onto the distal end and over the guide rod 48 which continues to guide the tubing over a first path that is coaxial with the guide rod 48 and the central opening of the guide tube 32.

With continued reference to FIG. 2, the apparatus comprises a carriage 50 that is slideably attached to the support structure so that it can move reciprocally between the severing means and an electronic component (not shown in FIG. 2) that is supported in the region identified by reference numeral 52. Because of the complexity of the assembly shown in FIG. 2, the individual segments of the present invention will be described in more detail below in conjunction with figures which isolate certain operative portions of the present invention.

In FIG. 2, a control panel 60 is provided along with a service light 62 and an operator control device 64. The operator work station is located between tables 70 and 72. During operation of the machine shown in FIG. 2, an operator places a component, such as a gear tooth sensor, in the region identified by reference numeral 52 and activates the machine. The machine automatically moves a tubing segment through a tube slitter and a spreader to attach the tubing to the component. Upon completion of this portion of the operation, the component is automatically discharged from the position identified by reference numeral 52 in FIG. 2.

Figure 3:
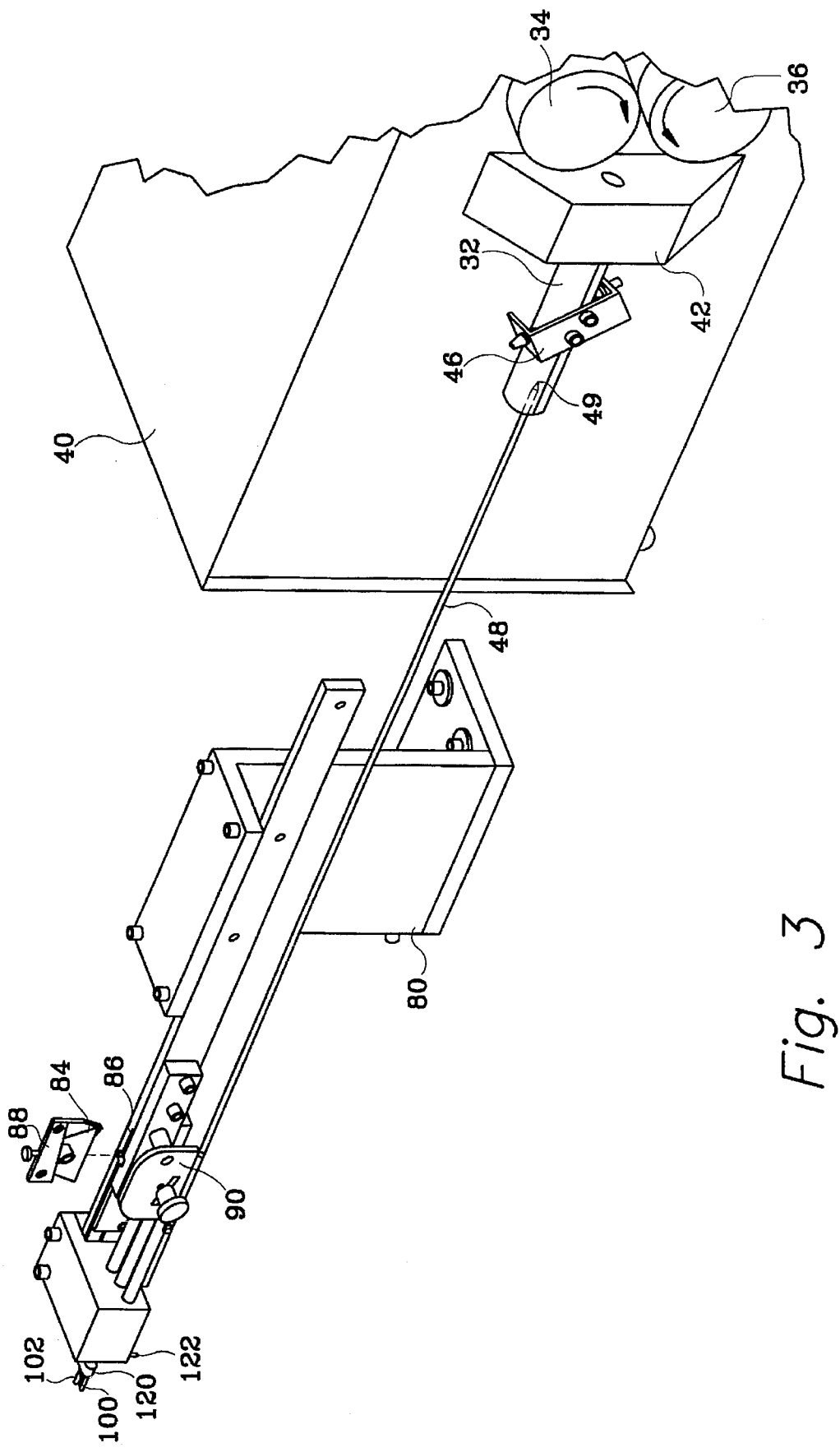
FIG. 3 is a perspective view of a portion of the device shown in FIG. 2.

FIG. 3 shows a portion of the present invention. As described above, reference numerals 34, 36, 40 and 42 represent a commercially available severing means and the housing in which it is contained. Rotating wheels 34 and 36 drive the continuously fed tubing from a feed reel and into a central opening of a guide tube 32. The presence of tubing within the guide tube 32 is detected by a photodetector 46 which comprises a light emitting diode and a light sensitive component. The guide rod 48 has a distal end 49, represented by dashed lines in FIG. 3, that is disposed proximate the central opening of the guide tube 32. The relationship between the guide tube 32 and the guide rod 48 is such that the leading end of the tubing must pass onto the guide rod 48 as it exits from the guide tube 32. In the embodiment shown in the Figures, roller 36 is a drive roller and roller 34 is a measuring roller that work in coordination with the severing means that is commercially available from the Versa Machinery Company.

A support stand 80 is provided to support the guide rod 48 and the mechanism shown at the left portion of the drawing in FIG. 3. A tube slitter comprises a knife edge 84 that is shown as an exploded view in FIG. 3. The knife edge is inserted into the slot 86. The knife edge 84, or blade, is attached to a quick blade holder 88. A blade fixture 90 is used to retain the quick blade holder 88 in position after it is disposed in slot 86. In certain embodiments of the present invention, the knife edge 84 is slightly tilted and inserted into an axial slot (not shown in FIG. 3) formed in the guide rod 48. This slot, in combination with the tilt of the knife edge 48, forces a tubing segment to pass over the cutting edge of the blade as it moves toward the left in FIG. 3. Attached to the guide rod 48, two fingers, 100 and 102, serve several purposes. First, the fingers hold a component prior to the attachment of a tubing segment to the wire portion of the component. Secondly, the fingers also form a portion of a spreader which moves the opposing edges of the axial slit of the tubing apart to facilitate its attachment to the wires of the component. The fingers, 100 and 102, are attached to the guide rod 48 in such a way that their distal ends can move relatively toward each other and away from each other in response to external forces. For example, when a component is attached between the fingers, the natural tendency of the fingers would be to move apart from each other in response to the insertion of a portion of the component between the distal ends of the fingers. However, the opposing edges of the axial slit in the tubing segment tend to move the fingers toward each other because of the natural elasticity of the tubing and the resulting compressive force that its opposite edges exert on the fingers. One embodiment has one stationary finger and one movable finger. Others could have two movable fingers. This will be described in greater detail below. With the exception of the movement of the fingers, 100 and 102, relative to each other and the rotation of the rolls, 34 and 36, the components shown in FIG. 3 are stationary. They provide the guiding function which guides the tubing along a first path that is concentric with the guide rod 48 and also perform the functions relating to the tube slitting operation, the spreader operation and the retaining operation that holds the component in the appropriate place during the attachment of the tubing portion to its wires.

FIGS. 4 and 5 show detailed illustrations of the device shown in FIG. 3. The guide rod 48 is aligned with the fingers, 100 and 102, so that continual movement of the tubing segment along the first path will move the leading edge of the tubing segment to the appropriate position to be sequentially slit by the tube slitter, spread by the spreader and moved onto the wires of the component. Also shown in FIG. 4 is an automatic ejection striker 120 which is used to push the completed component away from the fingers, 100 and 102, after the tubing insertion procedure is completed. An automatic ejection pusher rod 122 is connected to the automatic ejection striker 120 and shafts 124 that are axially slideable through the block identified by reference numeral 126 in FIG. 4.

FIG. 5 is similar to FIG. 4, but with certain portions of the components removed to facilitate the explanation and more clearly illustrate the physical structure and relationship of the individual components of the present invention. The fingers, 100 and 102, are shown placed generally in contact with each other. However, it should be understood that one or both of the fingers are pivotable about their point of contact with the guide rod 48 in the region identified by reference numeral 130. In other words, the distal ends of the fingers can move apart to create an opening into which a portion of a component can be inserted by an operator. In FIG. 5, a groove 140 is shown extending between the region identified by reference numeral 130 and the distal ends of the fingers. This groove 140, and an associated groove on the opposite side of the structure shown in FIG. 5, combine to guide and spread the opposing edges of the slit tubing segment during its insertion onto the wires of a component. With one of the opposing edges in groove 140 and the other opposing edge in a similar groove on the opposite side of the structure, the leading edge of the tubing segment is guided through the grooves toward the groove identified by reference numeral 142. Groove 142 directs the path of the leading edge of the tubing segment at an angle from the first path that is generally parallel to the guide rod 48. This starts the movement of the leading edge of the tubing segment downward and toward the wires of the component while continuing to spread the opposing edges away from each other. In addition, the compressive force between the opposing edges of the axial slit in the tubing segment also exerts a force that causes the distal ends of the fingers, 100 and 102, to move together relative to each other and hold the component in place.

FIG. 6 illustrates the movable portions of the present invention that are illustrated in FIG. 2. The carriage 50 is attached to the saddle 53 which is movable reciprocally on guide ways 200 and 202. A drive shaft, such as a ball screw drive, is rotated by motor 204 to cause the carriage 50 to move back and fourth along the guide ways, 200 and 202. The motor 204 is reversible. A flexible wire containment 206 provides electrical connection to the movable components. Flexible wire containments of this type are well known to those skilled in the art and are available in commercial quantities from several manufacturers. The carriage 50 is provided with a gripper 210 and a pusher 212. Both the gripper and the pusher are provided with movable jaws that can be controlled to move apart or together on command. The position of the carriage 50 is sensed by two proximity detectors, 220 and 222. Proximity detector 220 commands a deceleration of the drive motor 204 when the carriage reaches a first preselected location. Proximity detector 222 commands the drive motor 204 to stop when the carriage reaches a second preselected location. In a preferred embodiment of the present invention, the proximity detector 222 is also used to command a reversal of the drive motor 204 and the operation of the severing means described above in conjunction with FIGS. 2 and 3.

With continued reference to FIG. 6, three proximity detectors are used to provide variation in the length of the tubing segments severed and inserted onto the wires of the component. A first proximity sensor 240, in one particularly preferred embodiment of the present invention, is located at a position along the travel of the carriage 50 which permits the carriage 50 to be stopped at a location that will be associated with a tubing segment length of 11.81 inches or 300 millimeters. A third proximity sensor 244 is positioned along the travel of the carriage 50 that is associated with an alternative tubing segment length of 18.11 inches or 460 millimeters. The central proximity sensor 242 is provided to also permit a third length to be chosen.

With continued reference to FIG. 6, it should be understood that the carriage 50 moves toward the right in FIG. 6 with both the gripper 210 and pusher 212 opened. When it reaches its limit of travel toward the right of FIG. 6, as determined by a preselected one of the three proximity sensors, 240, 242 and 244, the gripper 210 and the pusher 212 are closed. The gripper 210 grips a portion of a tubing segment and, when the carriage 50 moves toward the left in FIG. 6, pulls the tubing segment away from the severing means. Simultaneously, the pusher 212 pushes the trailing end of the preceding tubing segment toward the tube slitter and spreader. This will be described in greater detail below, but it is important to understand the relationship between the components shown in FIGS. 3 and 6. The components shown in FIG. 3 are generally stationary, except for the potential movement of the fingers, 100 and 102, relative to each other and the rotation of wheels 34 and 36. On the other hand, the components shown in FIG. 6 are generally movable in conjunction with movement of the carriage 50 along the stationary guide ways, 200 and 202. When the components of FIGS. 3 and 6 are combined, the overall structure shown in FIG. 2 is achieved.

With reference to FIGS. 2, 3 and 6, the overall operation of the present invention will be described. At any typical time during the operation of the present invention, three separate portions of protective tubing will be in existence. A first long continuous portion will be fed from a feed reel, along dashed line 30, to the guide tube 32. In addition, after the severing operation provided by the components identified by reference numerals 34, 36 and 42, a first preselected one of a plurality of tubing segments is separated from the continually fed length of tubing. A previously severed second preselected one of the plurality of tubing segments is disposed on the guide rod 40 at a position closer to the tube slitter and spreader.

When the carriage is moving upward away from the fingers, 100 and 102, and toward the severing means 42, its gripper 210 and pusher 212 are both opened. When it stops at its uppermost position near the severing means, the gripper 210 and pusher 212 are both closed. The gripper 200 closes over the tubing segment that has most recently been severed from the continual length of tubing. The pusher 212 closes behind the trailing edge of a previously severed tubing segment that is disposed on the guide rod 48 below the location of the carriage 50. When the carriage again begins to move downward toward the tube slitter and spreader, the gripper 210 pulls the most recently severed tubing segment away from the severing means 42 while the pusher 212 pushes the trailing edge of the earlier severed tubing segment. As the carriage 50 moves down toward the tube slitter and spreader, it pushes the lower tubing segment through the tube slitter and spreader while it pulls the most recently severed tube segment into a preliminary position behind the tube segment that is currently being attached to a component supported by the fingers, 100 and 102. After pushing a tubing segment onto the wire of a component and stopping the carriage 50 at its lower most position near the tube slitter, the control system causes the severing means to feed a preselected length of tubing through the rolls, 34 and 36, and then sever that preselected tubing segment from the continuously fed length of tubing which is passing along dashed line 30 in FIG. 2. This operation is repeated sequentially each time the operator commands the apparatus to move by actuating the switch 64. The only operation required to be performed by the operator is the placement of a component into a position between the fingers, 100 and 102, prior to actuating the machine. All other operations are automatically controlled and performed. Even the removal of the component from the fingers is performed automatically.

Figure 7:
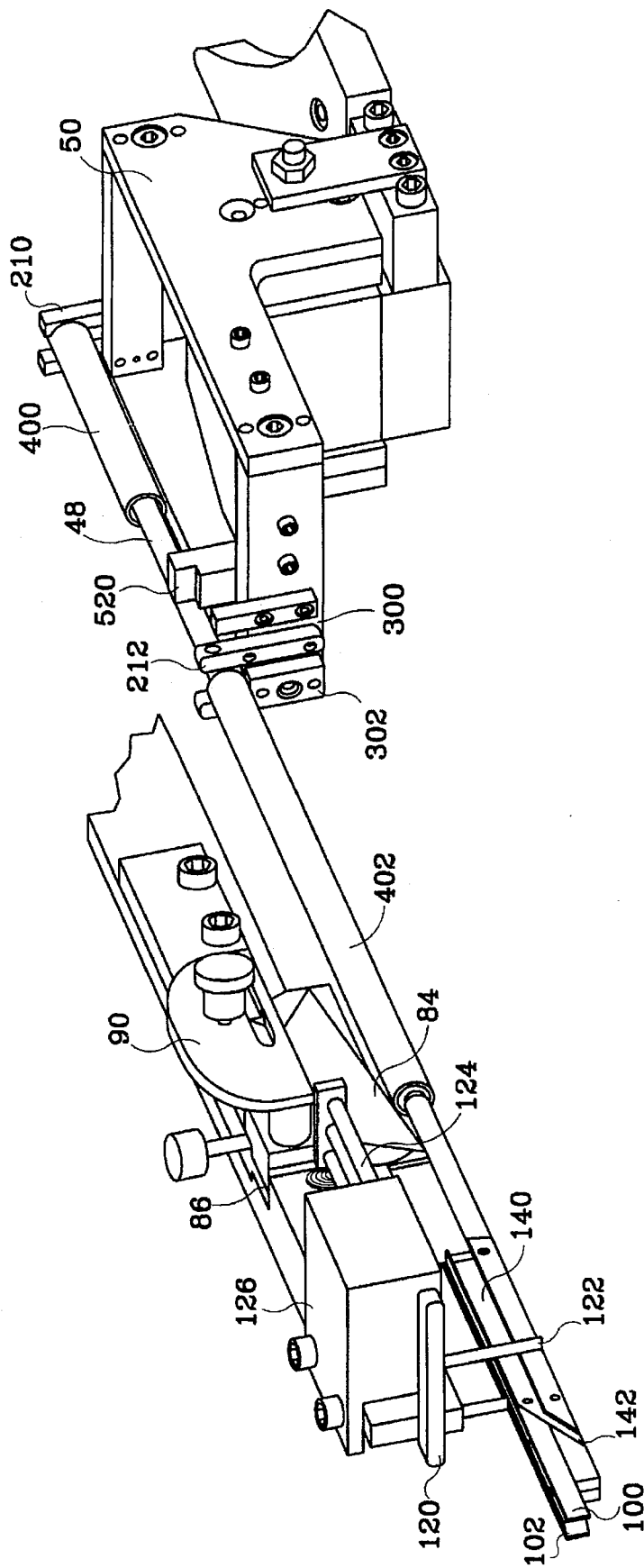
FIGS. 7–11 are sequential perspective views of the present invention in operation.

FIGS. 7–11 will be used to describe the sequential operations performed by the present invention. FIG. 7 shows the carriage 50 with its gripper 210 and its pusher 212. As described above, the gripper and the pusher each comprise two jaws that are movable toward each other by movement of a pneumatic slide portion of the carriage 300 to a stationary portion of the carriage 302. The fingers, 100 and 102, are located at the left end of the guide rod 48. The knife edge 84 is shown in its operative position with one portion of the knife edge disposed in an axial slot formed in the guide rod 48. In FIG. 7, a first preselected one of the plurality of tubing segments is identified by reference numeral 400. A second preselected one of the plurality of tubing segments is identified by reference numeral 402. It should be noted that the second preselected one 402 of the tubing segments had previously been severed from the continuous length by the severing means and the first preselected one 400 of the plurality of tubing segments was subsequently severed by the severing means. The gripper 210 closes on the outer surface of the first tubing segment 400 and, when the carriage 50 moves toward the left in FIG. 7, pulls the first tubing segment 400 away from the severing means and toward tube slitter and spreader. Simultaneously with this operation, the pusher 212 closes around the guide rod 48 and behind the trailing edge of the second tubing segment 402 to push it toward the left and through the tube slitter. In FIG. 7, the fingers, 100 and 102 are not shown with a component suspended between them. FIG. 7 only shows the components of the present invention and does not illustrate any component, such as a gear tooth sensor, associated with the mechanism.

Figure 8:
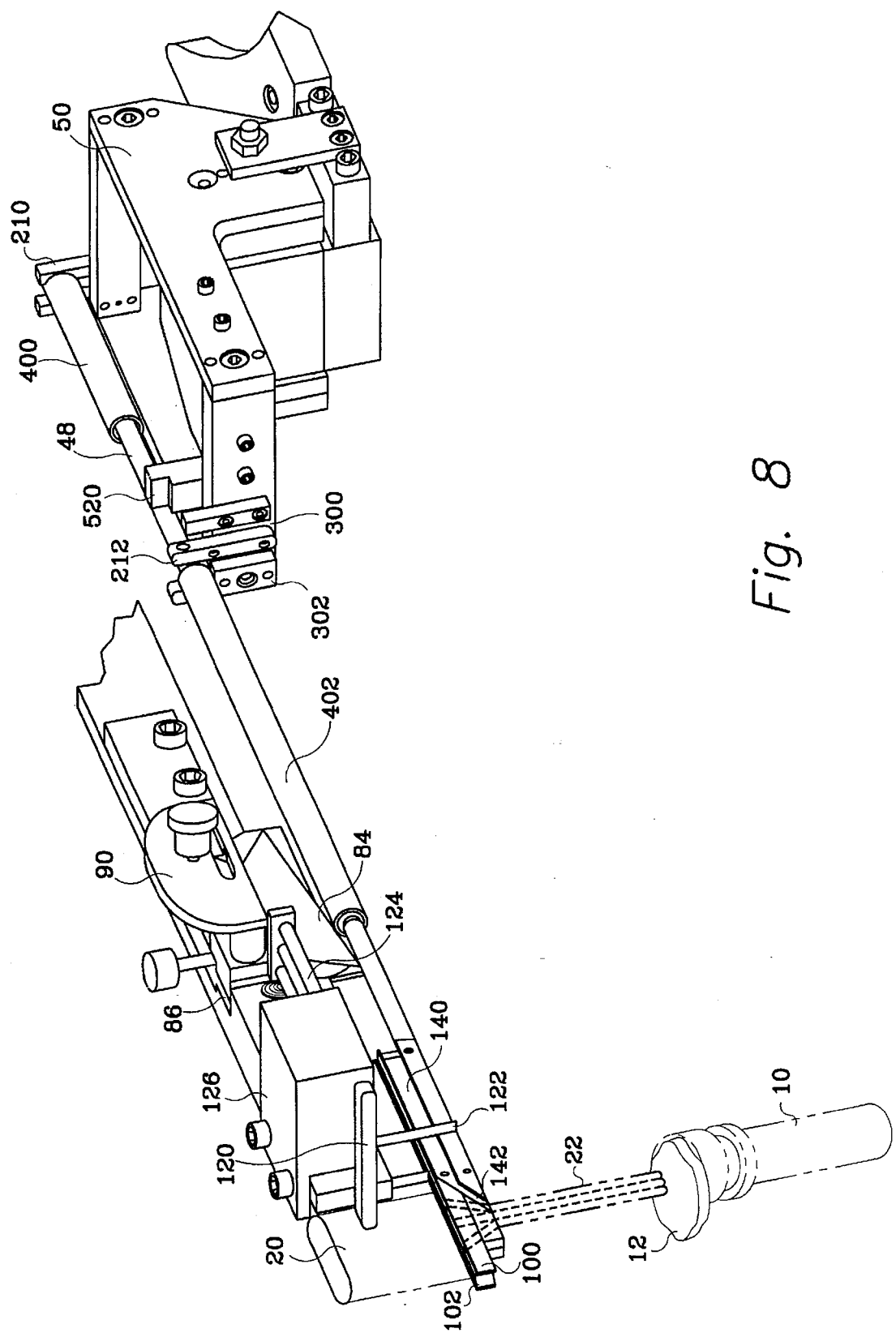

FIG. 8 is similar to FIG. 7, but with a gear tooth sensor shown by dashed lines suspended between the fingers. The wires 22 are placed between the fingers, 100 and 102, the wiring harness 20 is placed above the fingers and the operative or functional head of the sensor is suspended below the fingers by the wires 22. As the carriage 50 moves toward the left in FIG. 8, it pulls the first tubing segment 400 while it pushes the second tubing segment 402 toward the tube slitter. The leading edge of the second tubing segment 402 is pushed along the first path defined by the guide rod 48 and through the blade 84. Since a portion of the blade is disposed within an axial slot of the guide rod 48, the tubing segment 402 must be cut as it passes through the tube slitter portion of the device. The blade 84 creates an axial slit that has two edges facing each other. Those opposing edges are guided by groove 140 and a similar groove on the opposite side of the structure into groove 142 and a similar groove on the opposite side of the structure. The grooves cause the opposing edges of the axial slit to spread apart and also directs the leading edge of the tubing segment 402 toward the wires 22 of the component suspended between the distal ends of the fingers, 100 and 102.

Figure 9:
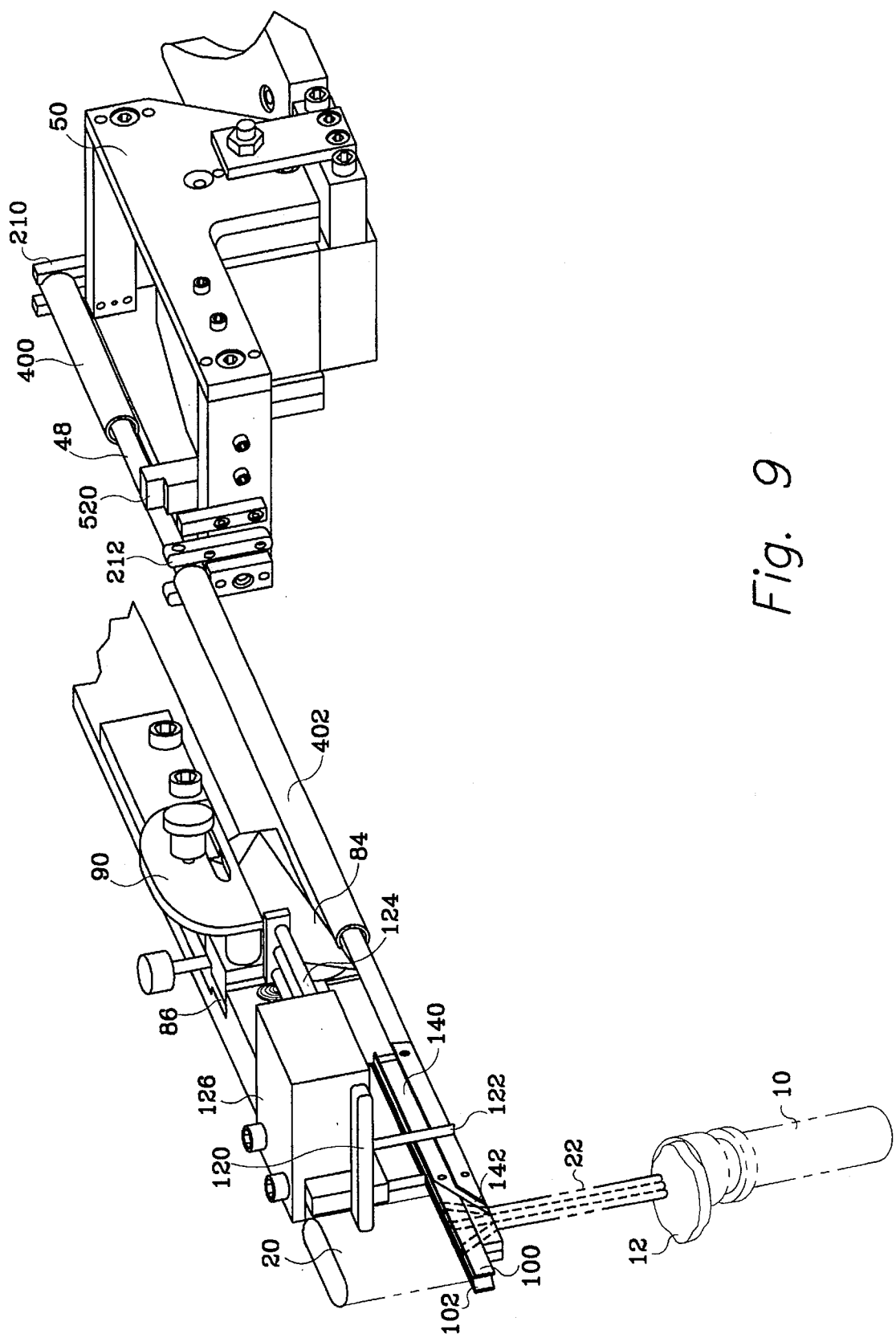

FIG. 9 shows the leading edge of the second tubing segment 402 moving past the blade 84 in response to its trailing end being pushed by the pusher 212 of the carriage 50. All of the other components are in their respective positions shown in FIG. 8. The wires 22 of the component remain between the distal ends of the fingers, 100 and 102. Both the first tubing segment 400 and the second tubing segment 402 are moved the same distance along the first path defined by the guide rod 48.

Figure 10:
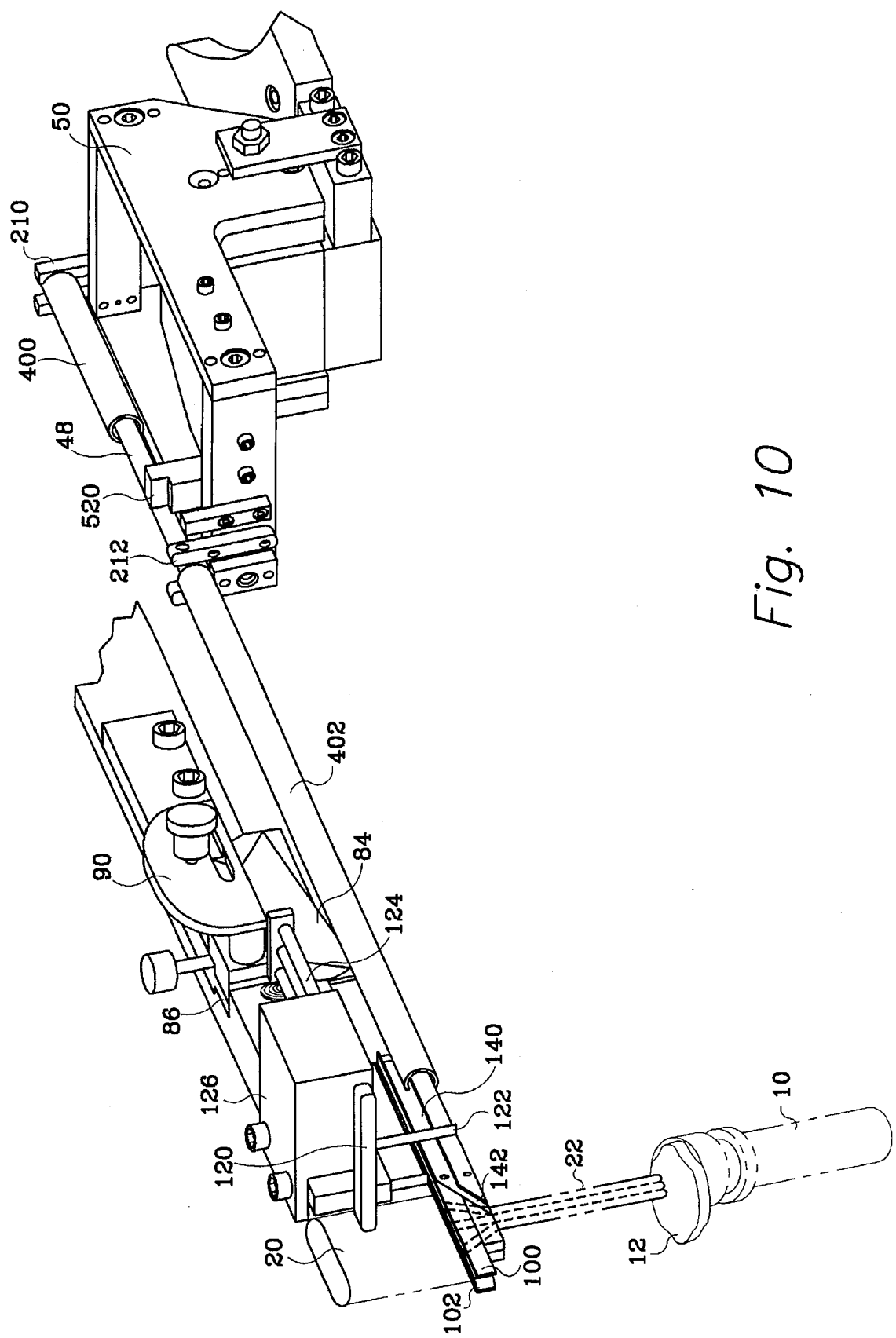

FIG. 10 shows the device of FIG. 9, but at a slightly later period of time. The carriage 50 continues to move toward the left and away from the severing means described above in conjunction with FIGS. 2 and 3. The leading edge of the second tubing segment 402 has passed through the tube slitter and the blade 84 continues to make an axial slit along the entire length of the tubing segment 402. The distance between the trailing edge of the second tubing segment 402 and the leading edge of the first tubing segment 400 remains constant throughout the operation. In FIG. 10, the leading edge of the second tubing segment 402 has moved into groove 140 and the opposing edges of the axial slit have begun to spread apart as they pass over the gradually widening structure in which groove 140 and a similar groove on the opposite side of the structure are formed.

Figure 11:
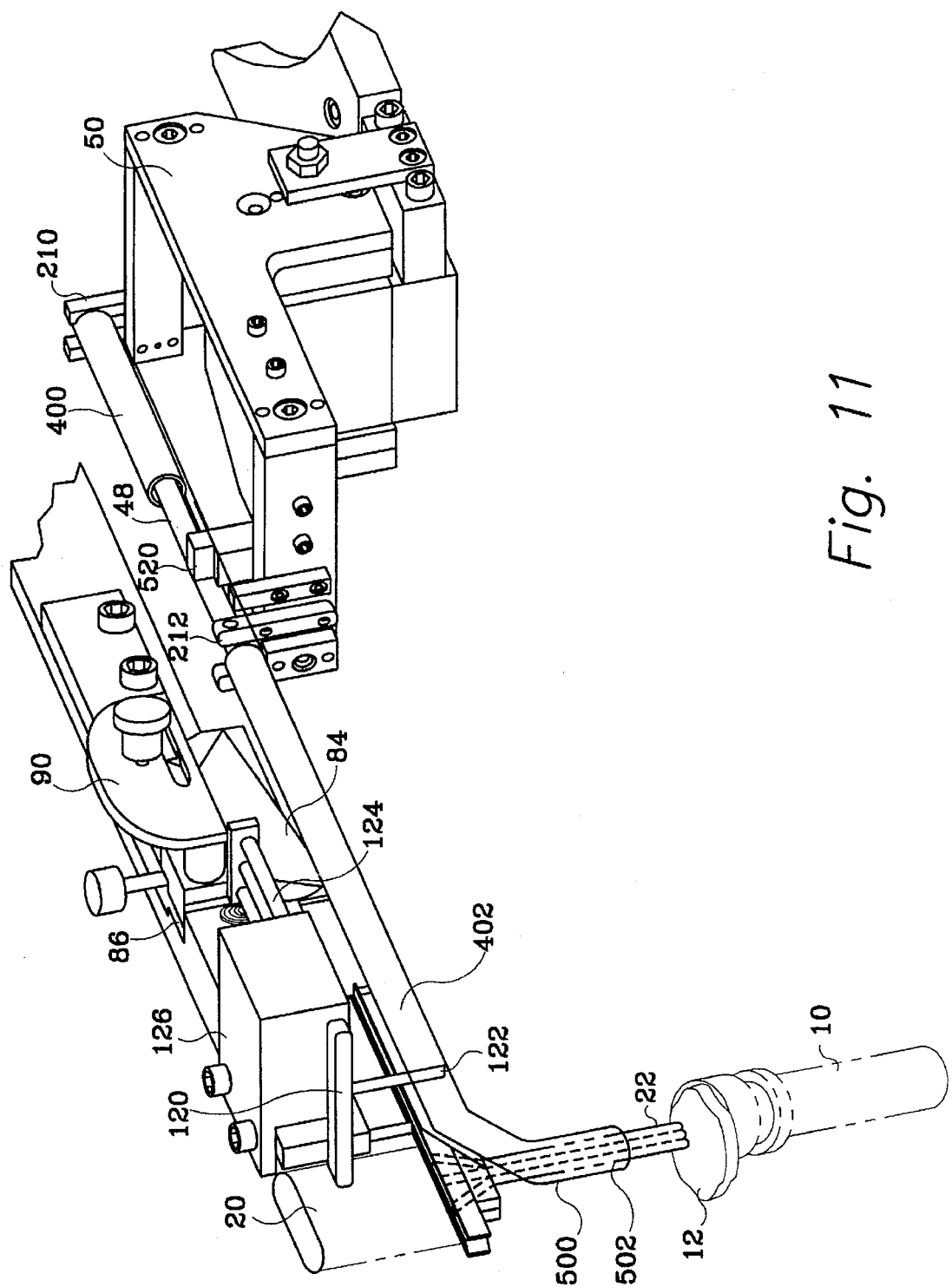

FIG. 11 shows a later stage in the movement of the carriage 50 toward the tube slitter. The second tubing segment 402 has moved further along the guide rod 48 from the position shown in FIG. 10. Groove 142, which is not identified in FIG. 11, has caused the leading edge of the second tubing segment 402 to be directed downward at an angle from groove 140 and the central axis of the guide rod 48. In addition, groove 142 has caused the opposing edges of the axial slit in the second tubing segment 402 to spread apart and provide a sufficient gap to allow the wires 22 to enter the central opening of the tubing segment prior to the reclosure of the axial slit. In FIG. 11, reference numeral 500 shows where the axial slit is opened with its opposing edges in noncontact relation with each other. Reference numeral 502 shows the axial slit reclosed in response to the natural elasticity of the tubing material. Where the leading edge of the second tubing segment initially contacted the wires 22 of the component, the axial slit 500 was at its widest condition with the opposing edges of the axial slit at their maximum distance apart from each other. This allows the opened slit 500 to pass over the wires 22 and continue to guide the tubing segment 402 downward along the wire structure.

When the carriage 50 moves to its limit of travel most proximate the distal ends of the fingers, 100 and 102, an automatic ejection pusher block 520 will strike the automatic ejection pusher rod 122 and cause the automatic ejection striker 120 to push the harness 20 of the component out of the position between the distal ends of the fingers. Under the force of gravity, the component and its assembled protective tubing will drop into a bin or other appropriate containment for temporary storage until either shipment to a customer or future operations are performed.

With reference to FIGS. 2, 3, 4, 5, 6 and 7-11, the operation of the present invention will be reviewed. At some preselected period of time, the carriage 50 will be at its position most proximate the severing means 42, a first preselected tubing segment will be located partially in the guide tube 32 and a second previously severed tubing segment will be located at the slitter and it will be partially slit by the tube slitter. At this point in time, the gripper 210 and the pusher 212 will be actuated to close them. The gripper 210 will seize the tubing segment just below the guide tube 32 and the pusher 212 will close around the guide rod 48. When the carriage 50 then moves downward towards the tube splitter, the first tubing segment 400 will be pulled away from the severing means 42. The pusher 212 will eventually contact the trailing edge of a previously severed second tubing segment 402 and continue to push it through the blade 84 of the tube slitter, causing its leading edge to eventually move into groove 140 and groove 142. As the carriage 50 continues to move downward toward the component between the distal ends of the fingers, 100 and 102, the first tubing segment 400 will continually be pulled downward along the first path defined by the guide rod 48 and the second tubing segment will be pushed by the pusher 212 completely through the tube slitter and spreader. As the carriage 50 arrives at its limit of travel, the second tubing segment 402 will be located around the wire 22 of a component and the leading edge of the first tubing segment 400 will be partially through the tube slitter. When the carriage 50 is at its bottommost limit of travel relative to the guide rod 48, the gripper 210 and pusher 212 are deactuated to open them and the carriage is returned to its upwardmost limit of travel near the severing means. During this return travel by the carriage 50, the first tubing segment 400 remains in its position relative to the tube slitter. In addition, as the carriage 50 returns toward the severing means or immediately prior to its return, the severing means is commanded to sever a subsequent tubing segment from the continuously fed length of tubing. The procedure is repeated, with the gripper 210 gripping the most recently severed tubing segment and the pusher 212 being closed to push against the trailing edge of the previously severed tubing segment through the tube slitter and over the spreader. When the carriage 50 is at its upper most position near the severing means, an operator places a new component between the fingers and pushes the actuation button 64 to cause the carriage 50 to repeat the operation by pulling the most recently severed tubing segment in the gripper 210 and pushing the previously severed tubing segment through the tube slitter and spreader.

The carriage 50 continually reciprocates back and fourth along the guide ways, 200 and 202, between limitations of travel defined by proximity sensors, 220 and 222, at one end of travel and other proximity sensors, 240, 242 or 244 at the other end of travel.

Although the present invention has been described in considerable detail to illustrate one specifically preferred embodiment of the present invention, it should be understood that alternative embodiments are also within its scope.

The embodiments of the invention in which an exclusive property or right is claimed are defined as follows:

1. A tubing attachment apparatus, comprising:

a support structure;

means attached to said support structure for guiding a length of said tubing along a first path;

means attached to said support structure for severing a plurality of tubing segments from said length of said tubing;

a carriage slideably attached to said support structure for reciprocal movement along a second path, said second path being generally parallel to said first path;

a tube slitter attached to said support structure for slitting each of said plurality of tubing segments along its central axis to form an axial slit;

a spreader attached to said support structure for spreading opposing edges of said axial slit away from each other;

means for retaining a component proximate said spreader;

means attached to said carriage for gripping a first preselected one of said plurality of tubing segments and moving said preselected one of said plurality of tubing segments away from said severing means and toward said tube slitter; and means attached to said carriage for pushing a second preselected one of said plurality of tubing segments past said tube slitter to form said axial slit, over said spreader to spread said opposing edges apart and onto a portion of said component.

2. The apparatus of claim 1, further comprising:

means for feeding said length of tubing toward said guiding means.

3. The apparatus of claim 1, wherein:

said spreader comprises two fingers that are relatively movable toward and away from each other, said two fingers being movable toward each other in response to a compressive force exerted by said opposing edges of said axial slit of said first preselected one of said plurality of tubing segments, wherein said retaining means comprises distal ends of said two fingers.

4. The apparatus of claim 1, wherein:

said severing means comprises a means for measuring a length of each of said plurality of tubing segments.

5. The apparatus of claim 1, wherein:

said gripping means and said pushing means are activated simultaneously during each movement of said carriage away from said severing means and toward said tube slitter.

6. The apparatus of claim 1, wherein:

said component is a gear tooth sensor.

7. The apparatus of claim 1, wherein:

said guiding means comprises a guide rod.

8. The apparatus of claim 7, wherein:

said guiding means further comprises a guide tube aligned in spaced relation with said guide rod.

9. The apparatus of claim 8, wherein:

said tube slitter comprises a knife edge.

10. The apparatus of claim 9, wherein:

said knife edge is partially disposed in a slot formed in said guide rod.

11. A tubing attachment apparatus, comprising:

a support structure;

means attached to said support structure for guiding a length of said tubing along a first path;

means attached to said support structure for severing a plurality of tubing segments from said length of said tubing;

a carriage slideably attached to said support structure for reciprocal movement along a second path, said second path being generally parallel to said first path;

a tube slitter attached to said support structure for slitting each of said plurality of tubing segments along its central axis to form an axial slit;

a spreader attached to said support structure for spreading opposing edges of said axial slit away from each other;

means for retaining a component proximate said spreader;

means attached to said carriage for gripping a first preselected one of said plurality of tubing segments and moving said preselected one of said plurality of tubing segments away from said severing means and toward said tube slitter;

means attached to said carriage for pushing a second preselected one of said plurality of tubing segments past said tube slitter to form said axial slit, over said spreader to spread said opposing edges apart and onto a portion of said component; and means for feeding said length of tubing toward said guiding means.

12. The apparatus of claim 11, wherein:

said spreader comprises two fingers that are relatively movable toward and away from each other, said two fingers being movable toward each other in response to a compressive force exerted by said opposing edges of said axial slit of said first preselected one of said plurality of tubing segments, wherein said retaining means comprises distal ends of said two fingers.

13. The apparatus of claim 11, wherein:

said severing means comprises a means for measuring a length of each of said plurality of tubing segments.

14. The apparatus of claim 11, wherein:

said gripping means and said pushing means are activated simultaneously during each movement of said carriage away from said severing means and toward said tube slitter.

15. The apparatus of claim 11, wherein:

said component is a gear tooth sensor.

16. The apparatus of claim 11, wherein:

said guiding means comprises a guide rod and a guide tube aligned in spaced relation with said guide rod.

17. The apparatus of claim 16, wherein:

said tube slitter comprises a knife edge and said knife edge is partially disposed in a slot formed in said guide rod.

18. A tubing attachment apparatus, comprising:

a support structure;

means attached to said support structure for guiding a length of said tubing along a first path;

means attached to said support structure for severing a plurality of tubing segments from said length of said tubing;

a carriage slideably attached to said support structure for reciprocal movement along a second path, said second path being generally parallel to said first path;

a tube slitter attached to said support structure for slitting each of said plurality of tubing segments along its central axis to form an axial slit;

a spreader attached to said support structure for spreading opposing edges of said axial slit away from each other;

means for retaining a component proximate said spreader;

means attached to said carriage for gripping a first preselected one of said plurality of tubing segments and moving said preselected one of said plurality of tubing segments away from said severing means and toward said tube slitter;

means attached to said carriage for pushing a second preselected one of said plurality of tubing segments past said tube slitter to form said axial slit, over said spreader to spread said opposing edges apart and onto a portion of said component; and means for feeding said length of tubing toward said guiding means, said spreader comprising two fingers that are movable toward and away from each other, said two fingers being movable toward each other in response to a compressive force exerted by said opposing edges of said axial slit of said first preselected one of said plurality of tubing segments, wherein said retaining means comprises distal ends of said two fingers, said severing means comprising a means for measuring a length of each of said plurality of tubing segments, said gripping means and said pushing means being activated simultaneously during each movement of said carriage away from said severing means and toward said tube slitter, said guiding means comprising a guide rod and a guide tube aligned in spaced relation with said guide rod.

19. The apparatus of claim 18, wherein:

said component is a gear tooth sensor.

20. The apparatus of claim 18, wherein:

said tube slitter comprises a knife edge and said knife edge is partially disposed in a slot formed in said guide rod.

\* \* \* \* \*